United States Patent
Vainshtein et al.

(10) Patent No.: US 12,316,533 B2
(45) Date of Patent: May 27, 2025

(54) NETWORK TRAFFIC ROUTING IN AN SD-WAN

(71) Applicant: Check Point Software Technologies Ltd., Tel Aviv (IL)

(72) Inventors: Tal Vainshtein, Tel Aviv (IL); Ofer Raz, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 294 days.

(21) Appl. No.: 17/811,609

(22) Filed: Jul. 11, 2022

(65) Prior Publication Data
US 2024/0015099 A1   Jan. 11, 2024

(51) Int. Cl.
| | | |
|---|---|---|
| G06F 15/16 | (2006.01) | |
| H04L 45/00 | (2022.01) | |
| H04L 45/12 | (2022.01) | |
| H04L 45/302 | (2022.01) | |
| H04L 45/42 | (2022.01) | |

(52) U.S. Cl.
CPC .......... *H04L 45/304* (2013.01); *H04L 45/123* (2013.01); *H04L 45/42* (2013.01); *H04L 45/566* (2013.01)

(58) Field of Classification Search
CPC ..... H04L 45/304; H04L 45/123; H04L 45/42; H04L 45/566; H04L 63/0227; H04L 63/0272; H04L 63/029; H04L 63/20
See application file for complete search history.

(56) References Cited

U.S. PATENT DOCUMENTS

| | | | |
|---|---|---|---|
| 7,188,175 B1* | 3/2007 | McKeeth | H04L 61/4511 709/227 |
| 7,529,225 B2* | 5/2009 | Joseph | H04L 65/104 370/352 |
| 8,687,791 B1* | 4/2014 | Cordell | H04M 3/5191 379/265.04 |
| 10,326,879 B1* | 6/2019 | Makagon | G06N 3/084 |
| 11,374,903 B1* | 6/2022 | Li | H04L 63/0227 |
| 2005/0078668 A1* | 4/2005 | Wittenberg | H04L 12/2876 370/389 |
| 2005/0207349 A1* | 9/2005 | Nagami | H04L 41/5009 370/241 |
| 2006/0203739 A1* | 9/2006 | Padmanabhan | H04L 43/0852 370/254 |
| 2009/0055551 A1* | 2/2009 | Baxter | H04L 67/563 709/239 |

(Continued)

*Primary Examiner* — Dustin Nguyen
*Assistant Examiner* — Hao H Nguyen
(74) *Attorney, Agent, or Firm* — Renner, Otto, Boisselle & Sklar, LLP

(57) ABSTRACT

A method and network gateway are provided for routing network traffic between internet service providers (ISPs) based on dynamic communication quality of the ISPs. Dynamic communication quality of the ISPs are monitored and compared by processor circuitry of the network gateway. When a session-based connection is being transmitted on an ISP having dynamic communication quality that does not meet a required communication quality of the connection, the processor circuitry transitions the session-based connection to an ISP meeting the required communication quality of the connection.

20 Claims, 3 Drawing Sheets

(56) References Cited

U.S. PATENT DOCUMENTS

| | | | |
|---|---|---|---|
| 2010/0020738 A1* | 1/2010 | Inouchi | H04L 47/70 370/315 |
| 2011/0122063 A1* | 5/2011 | Perlman | H04N 21/6125 345/161 |
| 2011/0153835 A1* | 6/2011 | Rimac | H04L 67/1051 709/227 |
| 2017/0264540 A1* | 9/2017 | Phelan | H04L 41/5087 |
| 2018/0309618 A1* | 10/2018 | Kumar | H04L 12/5692 |
| 2019/0364302 A1* | 11/2019 | Perlman | H04N 19/436 |
| 2020/0322168 A1* | 10/2020 | Su | H04L 9/3255 |
| 2021/0099361 A1* | 4/2021 | Lee | H04L 43/0864 |
| 2022/0023755 A1* | 1/2022 | Vukojevic | H04L 67/63 |
| 2022/0029906 A1* | 1/2022 | Mahesh | H04L 47/2408 |
| 2023/0119230 A1* | 4/2023 | Sinha | H04L 43/0852 370/389 |

\* cited by examiner

NETWORK TRAFFIC ROUTING IN AN SD-WAN

TECHNICAL FIELD

The present disclosure relates generally to software-defined wide area networks (SD-WANs) and more particular to routing of network traffic from an SD-WAN between internet service providers (ISPs).

BACKGROUND

A software-defined wide area network (SD-WAN) is a virtual WAN architecture that allows network traffic to be transported via combinations of transport services (e.g., multiprotocol label switching (MPLS), long-term evolution (LTE), and broadband internet services) to securely connect users to applications.

An SD-WAN securely and intelligently directs traffic across the wide area network (WAN), such that the management and operation of a WAN may be decoupled from the networking hardware. A key application of SD-WAN is to allow companies to build higher-performance WANs using lower-cost and commercially available Internet access.

SUMMARY

A software-defined wide area network (SD-WAN) solution allows a network gateway to connect to several internet service providers (ISPs), such that a user on the SD-WAN may be connected to the best performing ISP.

The choice between ISPs may be made when forming a connection between an internal and external device based on rules (e.g., based on the ISP with the lowest current latency). Currently, network gateways maintain a connection between an application and a server, such that the connection is preserved on the ISP that was initially chosen. However, ISP performance may vary significantly over time and the best ISP available for an application (e.g., teleconference application) may change.

The present disclosure provides a method for transitioning session-based connections in a SD-WAN between ISPs based on ISP performance.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
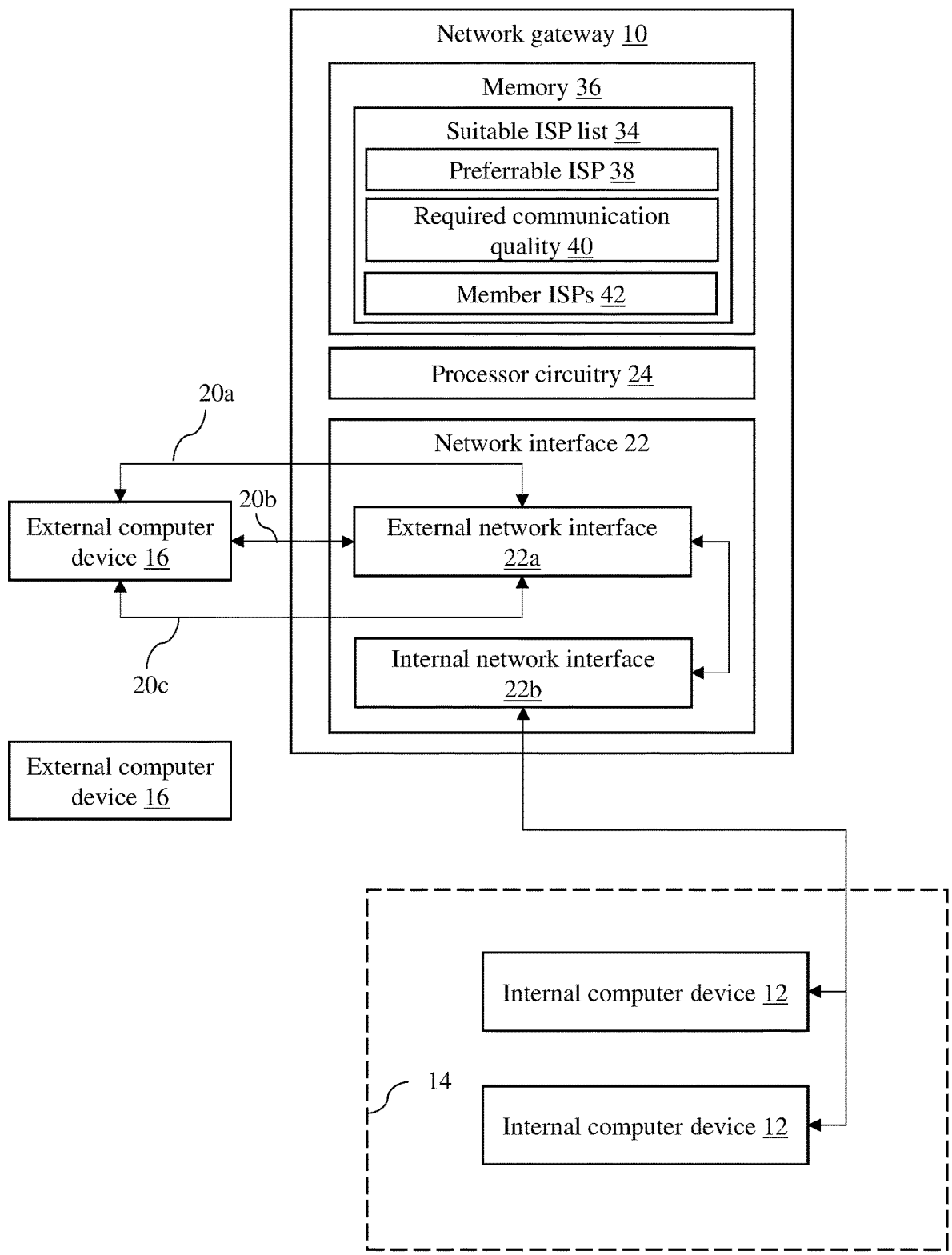
FIG. 1 is a schematic diagram of a network gateway for routing network traffic via multiple selectable internet service providers (ISPs).

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a method is provided for routing network traffic between internet service providers (ISPs) based on dynamic communication quality of the ISPs. Dynamic communication quality of the ISPs is monitored by processor circuitry of a network gateway. When an existing session-based connection is being transmitted on an ISP that does not meet required communication quality for the connection, the processor circuitry (1) identifies an available ISP meeting the required communication quality and (2) transitions the session-based connection to the identified better performing ISP.

Figure 2:
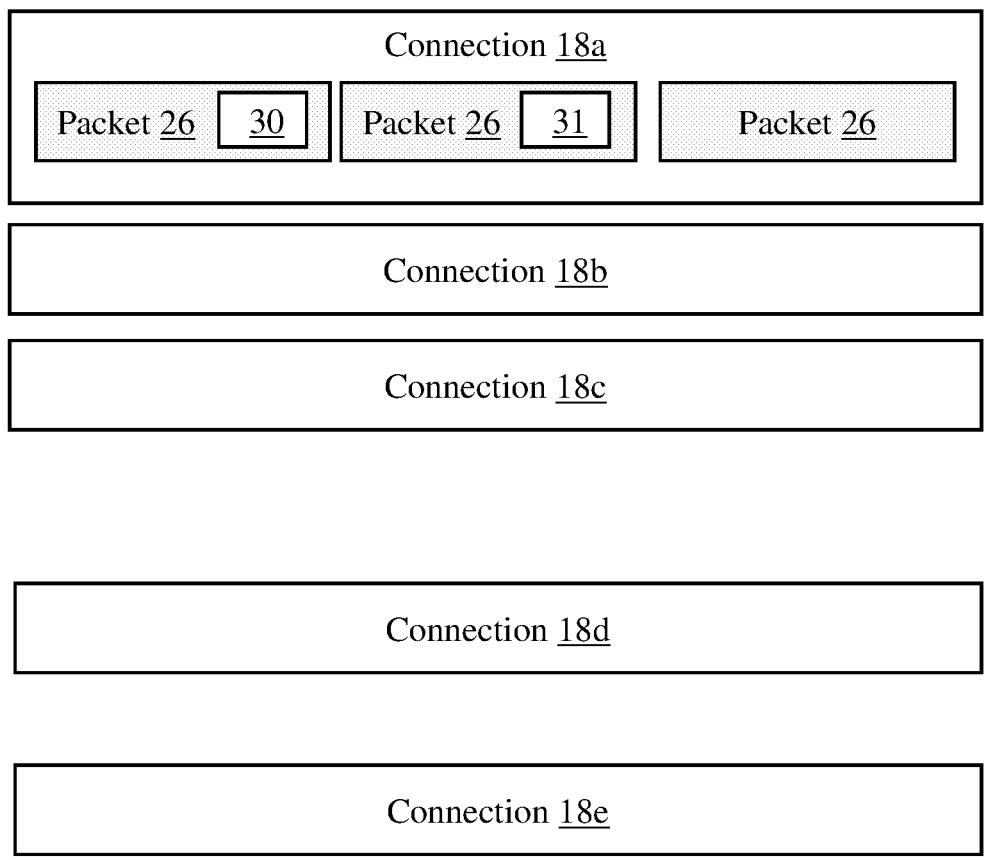
FIG. 2 is a schematic diagram of a session connection and two non-session connections.

Turning to FIG. 1, a network gateway 10 (also referred to as an electronic device) is shown for routing network traffic between internal computer devices 12 on a network 14 and external computer devices 16 outside of the network 14 via established connections 18 (FIG. 2). The network traffic travels from the network gateway 10 to the external computer devices 16 via internet service providers (ISPs) 20 including at least a first ISP 20a and a second ISP 20b. The network gateway 10 includes a network interface 22 and processor circuitry 24. The network interface 22 receives and transmits packets 26 of the network traffic for the internal computer devices 12.

As shown in FIG. 1, the network interface 22 may comprise multiple interfaces (also referred to as network interface controllers). For example, the network interface 22 may include an external network interface 22a and an internal network interface 22b. The external network interface 22a may handle communication with the external computer device(s) 16. Similarly, the internal network interface 22b may handle communication with the internal computer device(s) 12.

In one embodiment, the network interface 22 includes separate network interface controllers for each ISP 20. For example, the first ISP 20a may communicate with a first external network interface, the second ISP 20b may communicate with a second external network interface, and the third ISP 20c may communicate with a third external network interface.

As shown in exemplary FIG. 2, each packet 26 of the received and transmitted packets is a member of an associated connection 18. The associated connection 18 is between a particular internal computer device of the internal computer devices 12 and a particular external computer device of the external computer devices 16. Each of the existing connections 18 is either a session connection or a non-session connection. For example, in FIG. 2 connections 18a, 18b, and 18c are session connections that are a part of the same session, while connections 18*d* and 18*e* are non-session connections. Each of the connections 18 is trafficked via one of the ISPs 20 (referred to as a trafficking ISP).

A session is a time-delimited two-way link enabling information exchange between two or more communication devices (e.g., HTTP/3 sessions, telnet remote login sessions, a Session Initiation Protocol (SIP) based Internet phone call, etc.). A session is established at a certain point in time, and then brought to an end at some later point in time. A session is typically stateful, meaning that at least one of the communicating parties needs to hold current state information and save information about the session history to be able to communicate.

The internal and external computer devices 12, 16 may be any suitable electronic devices capable of communicating over a network. For example, the internal and external computer devices 12, 16 may include one or more of laptops, desktop computers, mobile devices, tablet computers, video game counsels, servers, etc.

The network gateway 10 may be any hardware configured to control access to the network 14 that the internal computer devices 12 are connected to. For example, the network gateway 10 may be any suitable computer devices for directing network traffic to and from the internal computer devices 12. The network traffic may refer to any information transmitted between the internal and external computer devices 12, 16 via a network.

The network gateway 10 may communicate with the internal computer devices 12 via the network interface 22 and external computer devices 16 via the network interface 22. As described above, the network interface controller 22 may include a separate internal network interface and external network interface. The network interface 22 (also referred to as a communication interface or network interface controller) may comprise one or more of a wireless network adaptor, an Ethernet network card, or any suitable device that provides an interface to a network. The network interface 22 may be communicatively coupled to the computer readable medium, such that the network interface 22 is able to send data stored on the computer readable medium across the network and store received data on a computer readable medium (also referred to as a memory) of the network gateway 10. The network interface 22 may also be communicatively coupled to the circuitry such that the circuitry is able to control operation of the network interface 22. The network interface 22, computer readable medium, and processor circuitry may be communicatively coupled through a system bus, mother board, or using any other suitable manner as will be understood by one of ordinary skill in the art.

The processor circuitry 24 monitors dynamic communication quality of the ISPs 20 and maintains at least one suitable ISP list 34. For example, the suitable ISP list(s) 34 may be stored in a memory 36 (e.g., non-transitory computer readable medium) of the network gateway 10. Each of the at least one suitable ISP list 34 is associated with a required communication quality 40 and includes the ISPs (referred to as member ISPs) 42 meeting the associated required communication quality 40. Each suitable ISP list 34 also includes a preferable ISP 38 of the ISPs.

The processor circuitry 24 may periodically receive data providing the dynamic communication quality for the ISPs 20 at a current time. Alternatively, the processor circuitry 24 may actively monitor the dynamic communication quality for the ISPs 20 (e.g., by pinging a particular IP address using the different ISPs).

For each packet of the received packets 26, the processor circuitry 24 analyzes the packet to determine whether the associated connection is a session connection. That is, the processor circuitry 24 determines whether the connection that the packet is a part of is a session connection.

The processor circuitry 24 may determine if a connection is a session connection based on properties of the connection. For example, Open Systems Interconnection (OSI) is a seven layered reference model describing specific protocols operating at different layers for connections.

For example, the first four levels of OSI describe the channel through which a specific request of a specific application on a client computer transmits data to a specific application on a server, and from the server back to the specific request on the client computer, regardless of the data that the application sends.

In many instances, applications do not define identifiers to the requests and rely on the lower OSI model layers' properties to differentiate between requests (e.g., using layer 3 and 4, where the client's IP address is one of the properties). When identifiers to the request are not defined, layer 5 (i.e., the session layer) is not utilized and the connection is a non-session connection.

Alternatively, the application may set a unique identifier to each request in the session layer (e.g., Zoom, MS Teams, or the more general protocol http/3), making such requests identifiable without relying on the lower layers' properties. These connections define a "session" and are referred to herein as session connections. Session connections allow for the lower layers' properties of a request to change (e.g., the client's IP address because of switching to another ISP) while the connection remains identifiable (e.g., to the server and the client's computer) using the identifier for the session layer of the connection.

When the associated connection is a non-session connection, the processor circuitry 24 maintains the associated connection on the trafficking ISP 20. That is, the processor circuitry 24 does not move the associated connection from the trafficking ISP to another ISP. Alternatively, when the associated connection is a session connection, the processor circuitry 24 determines the required communication quality of the associated connection. For example, the processor circuitry 24 may determine a type of application associated with the connection and use a lookup table to identify the required communication quality for the determined type of the application. Each quality requirement may have its own suitable ISP list 34, such that the identified required communication quality may be used to identify the suitable ISP list 34 (i.e., a list of ISPs that meet the quality requirement). That is, after determining the required communication quality, the processor circuitry 24 identifies the suitable ISP list 34 that is associated with the required communication quality of the associated connection (referred to as an associated ISP list). Alternatively, the type of application associated with the session connection may be associated with a suitable ISP list 34, such that the type of application may be used to identify the suitable ISP list 34.

After identifying the associated ISP list 34, the processor circuitry 24 determines whether the tracking ISP of the connection 18 is included in the associated ISP list 34. When the trafficking ISP is not included in the associated ISP list 34, the processor circuitry 24 transitions to the preferable ISP 38 the associated session of the associated connection.

The processor circuitry 24 may monitor one or more dynamic communication quality of at least two of the ISPs 20. For example, the dynamic communication quality may be at least one of latency, variation in response time, packet loss, throughput, bandwidth, state of the link, or throughput. Similarly, the required communication quality may include minimum acceptable values for one or more of the monitored dynamic communication qualities. As described above, the processor circuitry 24 may choose which dynamic communication qualities (also referred to as connection properties) to monitor and/or which to compare based on a lookup table or a received instruction identifying dynamic communication qualities to monitor for a type of connection. For example, if there exists a session associated with a teleconference application (e.g., Microsoft Teams, Zoom, FaceTime, etc.), or with a communication protocol (e.g., HTTP/3), the processor circuitry 24 may determine the preferable ISP based on a comparison between one or more dynamic communication quality that most affect perceived performance of a teleconference application (e.g., latency and bandwidth).

The processor circuitry 24 may rate the ISPs 20 (i.e., to determine the preferable ISP) by combining multiple dynamic communication quality using a weighting function. The characteristics of the weighting function (e.g., the weight applied to each of the included dynamic communication quality, etc.) may vary depending on the session (e.g., a type of application that the session is associated with).

Each of the established connections 18 may be between an inner computer device of the internal computer devices 12 and a server of the external computer devices 16. When the associated connection 18 is a transmission control protocol (TCP) connection, the processor circuitry 24 may transition the associated session 18 to the preferable ISP by sending a reset instruction (e.g., a reset packet) to the inner computer device 12, such that the inner computer device 12 reconnects to the server by sending reconnection packets to the server via the preferable ISP 20. The processor circuitry 24 may also send the reset packet to the client and the server (i.e., the inner computer device 12 and the server 16).

In one embodiment, the processor circuitry 24 transitions the associated session to the preferable ISP 20 by transmitting packets 26 of the associated session via the preferable ISP 20. When transitioning a session to a different ISP 20 (i.e., the preferable ISP), the session may be transitioned by altering an Internet protocol (IP) address of the internal computer device 12 for the transitioned associated session. That is, when an internal computer device 12 is communicating with a server (i.e., an external computer device 16), the communications may use an IP address for the internal computer device 12 that is associated with the current ISP. That is, if the internal computer device 12 is communicating with a server 16 over the first ISP 20*a*, then the IP address of the internal computer device 12 used in the communications with the server may be an IP address for the first ISP 20*a*. When the communications between the internal computer device 12 and the server 16 are transitioned to a second ISP 20*b*, the IP address included in the communications with the server 16 may be changed to an IP address for the second ISP 20*b*.

The processor circuitry 24 may monitor packets 26 being received and transmitted via the network gateway 10 to identify packets associated with sessions. The processor circuitry 24 may determine whether a packet 26 is associated with a session connection (i.e., a connection 18 that is a member of a session) using any suitable means. For example, the processor circuitry 24 may analyzing information stored in a header 30 or payload 31 of the packet 26, or by analyzing the content of the packet to determine the related application.

The processor circuitry 24 may have various implementations. For example, the processor circuitry 24 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 24 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 24. The processor circuitry 24 may be communicatively coupled to the computer readable medium and network interface through a system bus, mother board, or using any other suitable structure known in the art.

The internal computer devices 12 and the external computer devices 16 may communicate via multiple different sessions and connections. For example, at least one of the connections may be a session connection associated with a video conferencing application.

As shown in FIG. 1, the network gateway 10 may have a connection with a third ISP For example, the third ISP 20*c* may be a higher cost connection (such as a private line). Because the third ISP 20*c* has a higher cost, connections may be moved to the third ISP 20*c* only when the dynamic communication quality of the other ISPs are very poor (e.g., below a minimum acceptable connection threshold). For example, the third ISP 20*c* may only be identified as the preferable ISP 20 for any of the suitable ISP lists 34 when the dynamic communication quality of the first ISP 20*a* and the second ISP 20*b* are both below a minimum acceptable connection threshold. The minimum acceptable connection threshold may be static across sessions or may be varied depending on session properties. For example, sessions associated with teleconference applications may have a higher acceptable connection threshold (resulting in connections moving to the third ISP 20*c* more readily) than sessions associated with video game applications.

Figure 3:
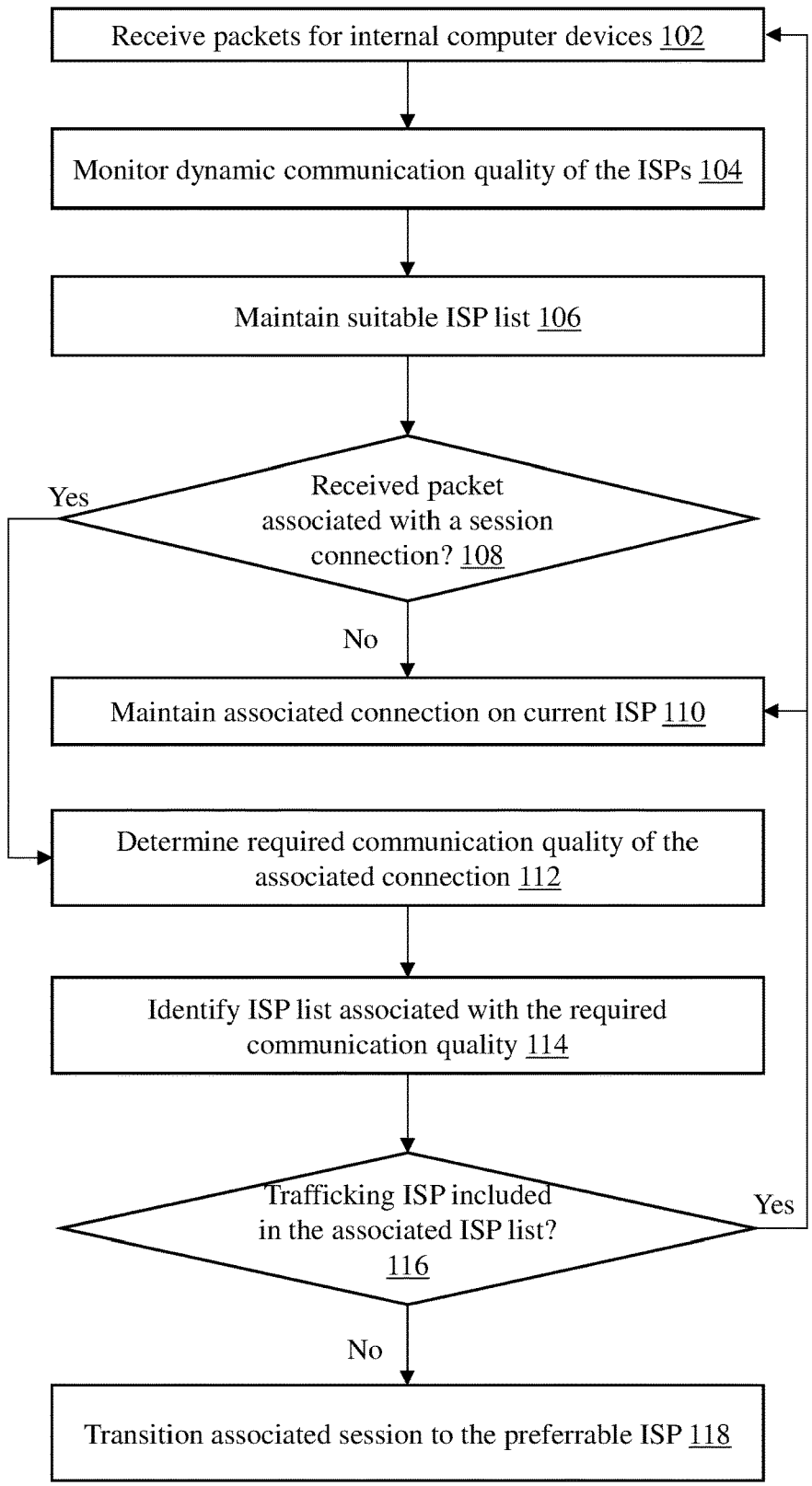
FIG. 3 is a flow diagram depicting a method for routing network traffic via multiple selectable internet service providers (ISPs).

Turning to FIG. 3, a method performed using processor circuitry is shown for routing network traffic via internet service providers (ISPs) 20 including at least a first ISP 20*a* and a second ISP 20*b*. In step 102, the network gateway 10 receives and transmits packets 26 of the network traffic for the internal computer devices 12. In step 102, the network gateway 10 monitors dynamic communication quality of the ISPs 20. In step 106, the network gateway maintains at least one suitable ISP list. In step 108, a check is performed to determine if a received packet is associated with a connection that is a session connection.

In step 110, if the connection is a non-session connection, then the connection is maintained on its current trafficking ISP. In step 112, if the connection is a session connection, the required communication quality of the associated connection is determined.

Following step 112, in step 114 an ISP list associated with the required communication quality is identified. In step 116, a check is performed to determine if the current trafficking ISP is included in the associated ISP list. If the trafficking ISP is included in the associated ISP list, then processing moves to step 110 and the connection is maintained on the current ISP. If not, then processing moves to step 118. In step 118, the session associated with the connection is transitioned to the preferable ISP of the associated ISP list.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An electronic device configured to route network traffic between internal computer devices on a network and external computer devices outside of the network via established connections, wherein the network traffic travels from the electronic device to the external computer devices via internet service providers (ISPs) including at least a first ISP and a second ISP, the electronic device comprising:
    a network interface configured to receive and transmit packets of the network traffic for the internal computer devices, wherein:
        each packet of the received and transmitted packets is a member of an associated connection of the established connections;
        each of the established connections is trafficked via a trafficking ISP comprising one of the ISPs;
        the associated connection is between a particular internal computer device of the internal computer devices and a particular external computer device of the external computer devices;
        each of the established connections is either:
            a session connection utilizing a session layer of the established connection; or
            a non-session connection not utilizing the session layer of the established connection;
    processor circuitry configured to:
        monitor dynamic communication quality of the ISPs;
        maintain at least one suitable ISP list, wherein each list of the at least one suitable ISP list:
            is associated with a required communication quality based on a type of application; and
            includes the ISPs meeting the associated required communication quality, and a preferrable ISP of the ISPs;
        for each packet of the received packets:
            when the associated connection is a non-session connection, maintaining the associated connection on the trafficking ISP; and
            when the associated connection is a session connection:
                determining the required communication quality of the associated connection including:
                    determining a type of application associated with the associated connection; and
                    looking up the required communication quality in the at least one suitable ISP list based on the determined type of the application;
                identifying as an associated ISP list the suitable ISP list that is associated with the required communication quality of the associated connection;
                determining if the trafficking ISP is included in the associated ISP list;
                when the trafficking ISP is not included in the associated ISP list:
                    transitioning the associated session of the associated connection to the preferrable ISP of the associated ISP list, such that the connections of the associated session are trafficked via the preferrable ISP of the associated ISP list.

2. The electronic device of claim 1, wherein the monitored dynamic communication quality includes at least one of latency, variation in response time, packet loss, throughput, bandwidth, state of the link, or throughput.

3. The electronic device of claim 1, wherein the processor circuitry transitions the associated session to the preferrable ISP by transmitting packets of the associated session via the preferrable ISP.

4. The electronic device of claim 1, wherein the associated session is transitioned to the preferrable ISP, such that an internet protocol (IP) address of the internal computer device is altered for the transitioned associated session.

5. The electronic device of claim 1, wherein the processor circuitry analyzes the packet to determine whether the associated connection is a session connection by analyzing information stored in a header or a payload of the packet, such that:
    packets lacking an identifier to the session layer of the associated connection are determined to be a non-session connection; and
    packets including the identifier to the session layer of the associated connection are determined to be a session connection.

6. The electronic device of claim 1 wherein:
    each of the established connections is between an inner computer device of the internal computer devices and a server of the external computer devices; and
    the processor circuitry is further configured to:
        when the associated connection is a transmission control protocol (TCP) connection, transition the associated session to the preferrable ISP of the associated ISP list by:
            sending a reset instruction to the inner computer device, such that the inner computer device reconnects to the server by sending reconnection packets; and
            sending the reconnection packets to the server via the preferrable ISP of the associated ISP list.

7. The electronic device of claim 1, wherein at least one of the connections is a session connection and the session connection is associated with an application that is maintaining a session connection.

8. The electronic device of claim 1, wherein:
    the ISPs include a third ISP; and
    the third ISP is only identified as the preferrable ISP of any of the at least one ISP lists when the dynamic communication quality of the first ISP and the second ISP are both below a minimum acceptable connection threshold.

9. A method performed using a network gateway including processor circuitry for routing network traffic between internal computer devices on a network and external computer devices outside of the network via established connections, wherein the network traffic travels from the network gateway to the external computer devices via internet service providers (ISPs) including at least a first ISP and a second ISP, the method comprising:
receiving and transmitting packets of the network traffic for the internal computer devices, wherein:
each packet of the received and transmitted packets is a member of an associated connection of the established connections;
each of the established connections is trafficked via a trafficking ISP comprising one of the ISPs;
the associated connection is between a particular internal computer device of the internal computer devices and a particular external computer device of the external computer devices;
each of the established connections is either:
a session connection utilizing a session layer of the established connection; or
a non-session connection not utilizing the session layer of the established connection;
monitor dynamic communication quality of the ISPs using the processor circuitry;
maintain with the processor circuitry at least one suitable ISP list, wherein each list of the at least one suitable ISP list:
is associated with a required communication quality based on a type of application; and
includes the ISPs meeting the associated required communication quality, and a preferable ISP of the ISPs;
for each packet of the received packets:
when the associated connection is a non-session connection, maintaining the associated connection on the trafficking ISP;
when the associated connection is a session connection:
determining the required communication quality of the associated connection including:
determining a type of application associated with the associated connection; and
looking up the required communication quality in the at least one suitable ISP list based on the determined type of the application;
identifying as an associated ISP list the suitable ISP list that is associated with the determined required communication quality of the associated connection using the processor circuitry;
determining with the processor circuitry if the trafficking ISP is included in the associated ISP list;
when the trafficking ISP is not included in the associated ISP list:
the processor circuitry transitioning the associated session of the associated connection to the preferrable ISP of the associated ISP list, such that the connections of the associated session are trafficked via the preferrable ISP of the associated ISP list.

10. The method of claim 9, wherein the monitored dynamic communication quality includes at least one of latency, variation in response time, packet loss, throughput, bandwidth, state of the link, or throughput.

11. The method of claim 9, wherein the associated session is transitioned to the preferrable ISP, such that an internet protocol (IP) address of the internal computer device is altered for the transitioned associated session.

12. The method of claim 9, wherein the processor circuitry analyzes the packet to determine whether the associated connection is a session connection by analyzing information stored in a header or payload of the packet, such that:
packets lacking an identifier to the session layer of the associated connection are determined to be a non-session connection; and
packets including the identifier to the session layer of the associated connection are determined to be a session connection.

13. The method of claim 9, wherein the processor circuitry transitions the associated session to the preferrable ISP by transmitting packets of the associated session via the preferrable ISP.

14. The method of claim 9 wherein:
each of the established connections is between an inner computer device of the internal computer devices and a server of the external computer devices; and
when the associated connection is a transmission control protocol (TCP) connection, the processor circuitry transitions the associated session to the preferrable ISP of the associated ISP list by:
sending a reset instruction to the inner computer device, such that the inner computer device reconnects to the server by sending reconnection packets; and
sending the reconnection packets to the server via the preferrable ISP of the associated ISP list.

15. The method of claim 9, wherein at least one of the connections is a session connection and the session connection is associated with a video conferencing application.

16. The method of claim 9, wherein:
the ISPs include a third ISP; and
the third ISP is only identified by the processor circuitry as the preferrable ISP of any of the at least one ISP lists when the dynamic communication quality of the first ISP and the second ISP are both below a minimum acceptable connection threshold.

17. A hardware network gateway configured to route network traffic between internal computer devices on a network and external computer devices outside of the network via established connections, wherein the network traffic travels from the hardware network gateway to the external computer devices via internet service providers (ISPs) including at least a first ISP and a second ISP, the hardware network gateway comprising:
a network interface configured to receive and transmit packets of the network traffic for the internal computer devices, wherein:
each packet of the received and transmitted packets is a member of an associated connection of the established connections;
each of the established connections is trafficked via a trafficking ISP comprising one of the ISPs;
the associated connection is between a particular internal computer device of the internal computer devices and a particular external computer device of the external computer devices;
each of the established connections is either:
a session connection utilizing a session layer of the established connection; or
a non-session connection not utilizing the session layer of the established connection;

processor circuitry configured to:
- monitor dynamic communication quality of the ISPs;
- maintain at least one suitable ISP list, wherein each list of the at least one suitable ISP list:
  - is associated with a required communication quality based on a type of application; and
  - includes the ISPs meeting the associated required communication quality, and a preferrable ISP of the ISPs;
- for each packet of the received packets:
  - when the associated connection is a non-session connection, maintaining the associated connection on the trafficking ISP; and
  - when the associated connection is a session connection:
    - determining the required communication quality of the associated connection including:
      - determining a type of application associated with the associated connection;
      - looking up the required communication quality in the at least one suitable ISP list based on the determined type of the application;
    - identifying as an associated ISP list the suitable ISP list that is associated with the determined required communication quality of the associated connection;
    - determining if the trafficking ISP is included in the associated ISP list;
    - when the trafficking ISP is not included in the associated ISP list:
      - transitioning the associated session of the associated connection to the preferrable ISP of the associated ISP list, such that the connections of the associated session are trafficked via the preferrable ISP of the associated ISP list.

18. The hardware network gateway of claim 17, wherein the monitored dynamic communication quality includes at least one of latency, variation in response time, packet loss, throughput, bandwidth, state of the link, or throughput.

19. The hardware network gateway of claim 17 wherein:
    - each of the established connections is between an inner computer device of the internal computer devices and a server of the external computer devices; and
    - the processor circuitry is further configured to:
      - when the associated connection is a transmission control protocol (TCP) connection, transition the associated session to the preferrable ISP of the associated ISP list by:
        - sending a reset instruction to the inner computer device, such that the inner computer device reconnects to the server by sending reconnection packets; and
        - sending the reconnection packets to the server via the preferrable ISP of the associated ISP list.

20. The hardware network gateway of claim 17, wherein:
    - the ISPs include a third ISP; and
    - the third ISP is only identified as the preferrable ISP of any of the at least one ISP lists when the dynamic communication quality of the first ISP and the second ISP are both below a minimum acceptable connection threshold.

* * * * *